Patented Oct. 26, 1937

2,096,735

UNITED STATES PATENT OFFICE 2,096,735

STABILIZED CHLORINATED SOLVENTS AND METHOD OF STABILIZING SUCH SOLVENT

Clarence F. Dinley, Detroit, Mich., assignor to James H. Bell, Philadelphia, Pa.

No Drawing. Application September 30, 1931, Serial No. 566,176

11 Claims. (Cl. 87—5)

My invention relates to volatile chlorinated solvents and their purification, stabilization, and use. Such solvents are exemplified by trichloromethane, tetrachloromethane, dichlorethane, tetrachlorethane, trichlorethylene, and tetrachlorethylene. An object of the invention is to prevent corrosion or other such action on metals exposed to such solvents, even when the solvents are heated and vaporized, and are exposed to the air or otherwise in contact with moisture. Such corrosion may arise in the cleaning of metal parts with chlorinated solvents, and in the use of such substances in metallic apparatus, for cleaning or for other purposes. The use of such solvents as cleaning and degreasing agents has been widely attempted, since they are well known as solvents for oils and other grease.

In the cleaning processes just referred to, metallic or other objects to be cleaned are introduced into a vessel or apparatus containing the heated solvent and its vapor, and constantly or intermittently open (or partly so) to permit the easy introduction and withdrawal of the objects treated. This is possible without excessive loss of solvent vapor because the latter is heavier than air, and because provisions are made to condense the solvent vapor and prevent its escape. Sometimes contact or treatment with the hot liquid solvent is mainly relied on to clean or degrease the object(s) or work; sometimes treatment with the solvent vapor; and sometimes both.

While chlorinated solvents have been found of great value for these and other purposes, their use has been attended with serious drawbacks. Metal articles cleaned with such solvents are subject to objectionable spotting, while metallic apparatus in which the solvents are used is subject to progressive corrosion, that greatly abbreviates its useful life. Also, dangerous fumes are given off, that injuriously affect workers and may even render the vicinity of the apparatus uninhabitable. However, I have discovered ways of obviating such drawbacks.

I have found, in the first place, that these drawbacks are not due to any action of the chlorinated solvents themselves, but to chlorine (present as impurity in the solvent) in available reactive forms, such as hydrochloric acid or other chlorine acids, and free chlorine, even. Commercial chlorinated solvents commonly contain such available chlorine, and may have an acidity that is of measurable magnitude. Moreover, exposure of the (hot) solvent to the atmosphere in the partly open apparatus results in decomposition yielding available (free) chlorine and/or acid, by reaction of the solvent with the atmospheric moisture, and with water that finds its way into the apparatus.

I have further found that in practice such troubles can be overcome by preparing the solvent or carrying out the treatment with it in suitable ways—preferably both. One way of doing this is to carry out the treatment with the solvent in the presence of a reagent that will neutralize or eliminate the available acid and chlorine, such as an alkali or an alkaline metal or compound that is readily chlorinatable,—and preferably water-insoluble or nearly so. Water soluble alkalis have the general drawback that any excess alkali may prove as detrimental as the acid that is to be neutralized. Because of their cheapness, various forms of calcium carbonate are commercially preferable, such as broken or crushed limestone or marble. However, many other substances are known to chemists as having suitable properties, including alkaline earth and other metal oxides and carbonates, such as magnesium oxide or carbonate, cadmium oxide, zinc oxide or carbonate, etc.

While such substances as indicated above perform their function very well in the liquid solvent, their influence is not felt in the vapor of the solvent; and it is especially in the vapor phase that the solvent decomposes, and that acid and (free) available chlorine are formed. Best results are obtained, therefore, by carrying out the treatment in the presence of a reagent that is of such volatility as to vaporize with the solvent, and that will stabilize the solvent vapor or counteract the objectionable decomposition,—whether by being itself readily chlorinated, or by neutralizing deleterious products formed in the vapor, or by preventing the usual decomposition of the solvent (i. e., stabilization in a stricter sense). Whatever its action, the stabilizing agent employed should, of course, be compatible with the undecomposed solvent, so as neither to react with it under the conditions of use, nor to be driven off or separate from the solvent. That it should not boil so much below the solvent as to be driven off by the heat is also implied in its compatibility with the solvent, as well as in the statement that it vaporizes with the solvent. This last statement also implies, of course, that the stabilizer volatilizes without being itself decomposed by the heat. A great many organic substances such as hereinafter indicated are known to chemists as having suitable properties.

Examples of the class that are effective, as I believe, by neutralizing the (chlorine) acid, as well as by undergoing chlorination, are the volatile organic bases such as amines, characterized by the NH₂ radical, and pyridine and the like, characterized by the nitrogen radical,—which in the case of pyridine is included in the ring. Such organic bases are generally soluble in (moist) trichlorethylene and other chlorinated solvents, and impart an alkaline reaction when used in sufficient proportions, such as those hereinafter indicated. The alkaloids such as caffeine, quinine, etc., are in general not sufficiently volatile for the purposes of my composition as now claimed herein.

Examples of another class are camphor and turpentine, which are chlorinatable (though not bases) and prevent or inhibit the usual decomposition of chlorinated solvents in the presence of moisture,—or at least obviate corrosion of metal when exposed to such solvents. Characteristically known as essential oils, such substances are volatile, are generally soluble in chlorinated solvents, including trichlorethylene, and steam-distil.

In admixture with solvents with which they are compatible and suitably correlated as regards volatility, as already stated, volatile stabilizers are effective in the vapor phase, when atmospheric moisture comes in contact with the solvent vapor, as well as in the liquid solvent. Insofar as the stabilizing agents are chlorinated by chlorine acid formed by incipient decomposition of the solvent, or neutralize such acid, this removal of a decomposition product seems one probable rationale of the stabilizing effect. This applies equally to chlorination of the stabilizer in the strict sense, involving insertion or substitution of chlorine in the stabilizer molecule, or its addition thereto, and to chlorination involving the addition of chlorine acid (HCl) to the stabilizer molecule to form a hydrochloride. Irrespective of neutralization or chlorination, however, it would seem that many of my stabilizers have a more strictly inhibitory power as against the decomposition of the solvent vapor and/or the reaction of the resulting chlorine (acid) with metal,—particularly the essential oils, as already mentioned.

In this application, I aim to cover the generic invention involved in the use of volatile organic stabilizers generally for my purpose, and to cover more specially the organic base type or class of stabilizers consisting essentially of amines and basic cyclic organic compounds characterized by nitrogen in the ring,—of which latter the pyridines are prominent examples. But I do not herein specifically claim the use of essential oils, which is covered specifically in my divisional application Serial No. 9,447, filed March 5, 1935, nor of alkaloids, covered by my divisional application Serial No. 725,732, filed May 15, 1934.

As such organic agents are comparatively expensive, it may be desirable to use the much less expensive solid alkalis like marble or limestone in conjunction with them, to take care of (chlorine) acid or other forms of available chlorine existing or produced in the liquid solvent. For this purpose, several handfuls of broken marble or limestone may be put into the pools of liquid in the apparatus where objects are treated with solvent, and these deposits replenished from time to time, so as to assure an ample supply at all times; and the organic stabilizer may be added to the liquid solvent in the apparatus before it has been materially heated,—as soon as the marble or limestone has had a chance to free the solvent of its initial acid or the like. Instead, however, of treating and stabilizing the solvent in the apparatus where objects are treated therewith, it is preferable to do this beforehand.

In general, the proportion of the organic stabilizer added to the solvent may be anywhere from about ¼ of 1% to about 1½% by weight. However, larger proportions may sometimes be used: e. g., ¼ to 5% of pyridine, which has no effect on steel; although in excess it will slightly tarnish highly polished brass.

Such proportions of organic stabilizer generally suffice to maintain an admixture thereof with the heated chlorinated solvent not merely during one ordinary treatment of work with the solvent, but over an extended period of use of the solvent, involving a series of such treatments.

Such purified and stabilized chlorinated solvents are useful for many purposes besides the cleaning processes hereinbefore referred to, and will not cause corrosion or give off objectionable fumes as long as any of the stabilizing ingredient remains.

In using such prepared solvent in the cleaning processes above indicated, its stability may be prolonged by the presence of marble or limestone in the apparatus, as explained above, and may be extended indefinitely by repeated timely additions of the organic stabilizing agent. Because of the highly toxic nature of aniline, and because the Ellis composition is intended to be used in confined places where even odor is important, it is obvious that Ellis can only use such small quantity of aniline as would be consumed in neutralizing acidity of his ethyl acetate, which readily decomposes to form acetic acid and regularly contains it commercially,—to say nothing of the hydrochloric acid regularly formed by spontaneous decomposition of highly pure trichlorethylene. Thus Ellis' composition contains no free aniline to give it an alkaline reaction,—such as imparted to my solvent by my organic base and alkaloid stabilizers when used in the proportions which I have indicated,—or to stabilize it. So far, indeed, from claiming that his aniline acts as a stabilizer, Ellis definitely indicates the contrary by enjoining that his composition should be put up in a light-proof package.

The boiling points of volatile aliphatic chlorinated solvents and of specific volatile stabilizers hereinbefore mentioned are as follows:

| | |
|---|---|
| Trichloromethane | 61° C. |
| Tetrachloromethane | 77° C. |
| Dichlorethane | 84° C. |
| Trichlorethylene | 87° C. |
| Tetrachlorethylene | 121° C. |
| Tetrachlorethane | 146° C. |
| Pyridine | 115° C. |
| Turpentine | 159° C. |

To distinguish these and other similarly volatile solvents, I have limited certain of my claims to chlorinated aliphatic (or other) hydrocarbon solvents boiling under substantially 150° C.

To express more definite correlation of the stabilizer with the solvent, I have in certain claims referred to the boiling point of the stabilizer as sufficiently near that of the solvent to insure vaporization of the stabilizer concurrently with the boiling of the solvent in substantial proportion under the influence of heat,—as contrasted with the minute proportions (less than 1/10 of 1%) in which substances boiling very much higher than the solvent (e. g., aniline as compared with trichlorethylene) would vaporize with the boiling solvent.

Having thus described my invention, I claim:

1. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and volatilizing, along with the organic chlorinated solvent that is exposed to the atmosphere or to moisture, an organic stabilizer that is soluble in and compatible with the moist chlorinated solvent, volatilizing with it without being decomposed by heat but not boiling off from it below the boiling point of the chlorinated solvent; and treating the objects with the solvent thus stabilized, while maintaining admixture of volatilized organic stabilizer with the chlorinated solvent vapor during the exposure of the solvent to the atmosphere or to moisture.

2. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and vaporizing, along with the organic chlorinated solvent that is exposed to the atmosphere or to moisture, a stabilizing organic base that is chlorinatable and also compatible with the moist chlorinated solvent, vaporizing with it without being decomposed by heat but not boiling off from it below the boiling point of the chlorinated solvent; and treating the objects with the solvent thus stabilized, while maintaining admixture of vaporized organic stabilizer with the chlorinated solvent vapor during the exposure of the solvent to the atmosphere or to moisture.

3. An improved process of treating greasy objects with hot volatile organic chlorinated grease solvents that decompose when exposed in the vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and volatilizing, along with the organic chlorinated solvent that is exposed to the atmosphere or to moisture, an organic stabilizer that is soluble in and compatible with the moist chlorinated solvent, volatilizing with it without being decomposed by heat and not boiling off from it below the boiling point of the chlorinated solvent; and treating the objects with the solvent thus stabilized, while maintaining admixture of volatilized organic stabilizer with the chlorinated solvent vapor during the exposure of the metal parts to the solvent and of the solvent to the atmosphere or to moisture.

4. An improved process in accordance with claim 3 wherein the organic stabilizer is a basic volatile cyclic organic compound characterized by nitrogen in the ring.

5. An improved process of treating greasy objects with hot volatile organic chlorinated grease solvents that decompose when exposed in the hot vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and vaporizing, along with the organic chlorinated solvent that is exposed to the atmosphere or to moisture, a stabilizing organic base that is chlorinatable and imparts an alkaline reaction to the moist chlorinated solvent, and is also compatible with the chlorinated solvent, volatilizing with it without being decomposed by heat and not boiling off from it below the boiling point of the chlorinated solvent; and treating the objects with the solvent thus stabilized, while maintaining admixture of vaporized organic base with the chlorinated solvent vapor during the exposure of the metal parts to the solvent and of the solvent to the atmosphere or to moisture.

6. An improved process in accordance with claim 2 wherein the organic stabilizer is a volatile amine base characterized by the nitrogen radical.

7. An oil and grease solvent composition, stabilized and adapted for cleaning or grease-solvent use while hot under atmospheric exposure or with moisture, and comprising volatile chlorinated hydrocarbon grease solvent boiling under substantially 150° C., in combination with a compatible stabilizing organic base, of the class consisting of amines and of basic cyclic organic compounds characterized by nitrogen in the ring, that is volatile in the stated range and boils sufficiently near the boiling point of the solvent to insure its vaporization concurrently with the boiling of the solvent in substantial proportion, under the influence of heat, and is present in sufficient proportion to impart an alkaline reaction to the composition and to stabilize the solvent against decomposition in the hot vapor state.

8. An oil and grease solvent composition, stabilized and adapted for cleaning or grease-solvent use while hot under atmospheric exposure or with moisture, and comprising volatile chlorinated aliphatic hydrocarbon grease solvent boiling under substantially 150° C., in combination with a compatible chlorinatable stabilizing organic amine base that is soluble in the moist chlorinated solvent, is volatile in the stated range and boils sufficiently near the boiling point of the solvent to insure its vaporization concurrently with the boiling of the solvent in substantial proportion, under the influence of heat, and is present in sufficient proportion to impart an alkaline reaction to the composition and to stabilize the solvent against decomposition in the hot vapor state.

9. An oil and grease solvent composition, stabilized and adapted for cleaning or grease-solvent use while hot under atmospheric exposure or with moisture, and comprising volatile chlorinated hydrocarbon grease solvent boiling under substantially 150° C., in combination with a compatible basic cyclic organic compound characterized by nitrogen in the ring that is soluble in the moist chlorinated solvent, boils within the stated range and sufficiently near the boiling point of the solvent to insure its vaporization concurrently with the boiling of the solvent in substantial proportion, under the influence of heat, and is present in sufficient proportion to impart an alkaline reaction to the composition and to stabilize the solvent against decomposition in the hot vapor state.

10. An oil and grease solvent composition, stabilized and adapted for cleaning or grease-solvent use while hot under atmospheric exposure or with moisture, and comprising volatile aliphatic chlorinated hydrocarbon grease solvent boiling under substantially 150° C., in combination with a compatible volatile pyridine that is soluble in the moist solvent, boils sufficiently near the boiling point of the solvent to insure its vaporization concurrently with the boiling of the solvent in substantial proportion, under the influence of heat, and is present in sufficient proportion to impart an alkaline reaction to the composition and to stabilize the solvent against decomposition in the hot vapor state.

11. An oil and grease solvent composition, stabilized and adapted for cleaning or grease-solvent use while hot under atmospheric exposure or with moisture, and comprising trichlorethylene in combination with pyridine present in sufficient proportion to impart an alkaline reaction to the composition, and by vaporizing concurrently with the trichlorethylene to stabilize it against decomposition in the hot vapor state.

CLARENCE F. DINLEY.

CERTIFICATE OF CORRECTION.

Patent No. 2,096,735.

October 26, 1937.

CLARENCE F. DINLEY.

It is hereby certified that error appears in the printed specification of the above numbered patent requiring correction as follows: Page 2, second column, line 29, after the period and before "Because" insert the words and period I am aware of U. S. Patent No. 1,557,720, granted October 13, 1925, to Carleton Ellis.; page 3, first column, line 45, claim 3, after "the" insert the word hot; line 66, claim 4, for the claim reference numeral "3" read 4; second column, strike out lines 18, 19, 20 and 21 inclusive, comprising claim 6; and after line 42, first column, insert the following as claim 3:

> 3. An improved process in accordance with claim 2 wherein the organic stabilizer is a volatile amine base characterized by the nitrogen radical.

For the claims now numbered "3", "4" and "5" read 4, 5 and 6; and that the said Letters Patent should be read with these corrections therein that the same may conform to the record of the case in the Patent Office.

Signed and sealed this 18th day of January, A. D. 1938.

(Seal)

Henry Van Arsdale,
Acting Commissioner of Patents.